June 4, 1940.  G. L. DIMMICK  2,203,191
SOUND RECORDING
Filed April 29, 1936  3 Sheets-Sheet 1
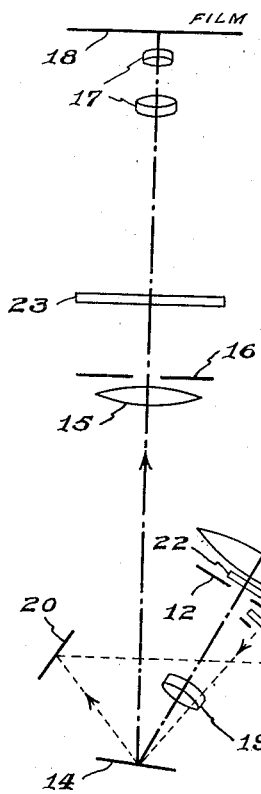
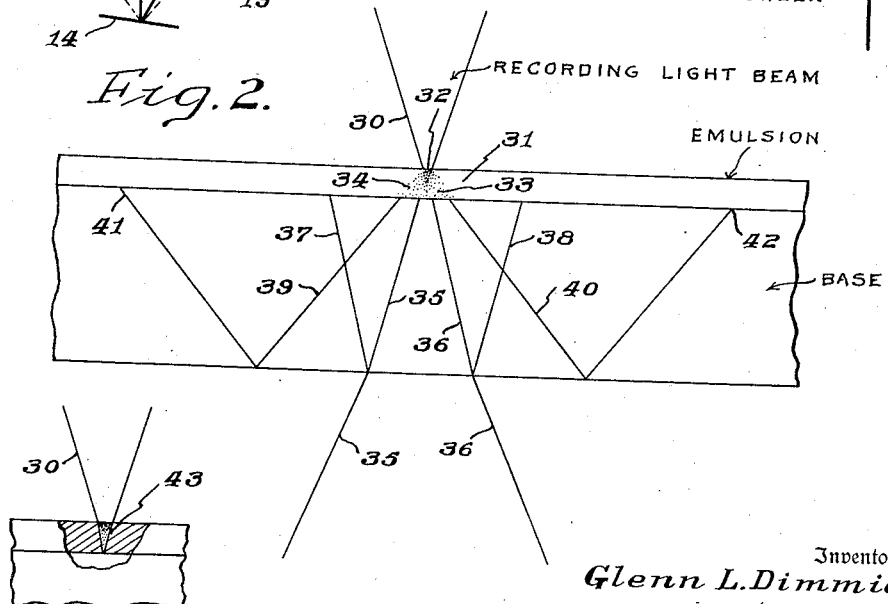
Inventor
Glenn L. Dimmick
By
Attorney June 4, 1940.  G. L. DIMMICK  2,203,191
SOUND RECORDING
Filed April 29, 1936   3 Sheets-Sheet 2

Inventor
Glenn L. Dimmick

June 4, 1940.

G. L. DIMMICK 2,203,191

SOUND RECORDING

Filed April 29, 1936

Inventor
Glenn L. Dimmick

By

Attorney

Patented June 4, 1940

2,203,191

UNITED STATES PATENT OFFICE 2,203,191

SOUND RECORDING

Glenn L. Dimmick, Erlton, N. J., assignor to Radio Corporation of America, a corporation of Delaware Application April 29, 1936, Serial No. 76,901

3 Claims. (Cl. 274—46)

This invention relates to the recording and printing of sound on film and more particularly to a method of and apparatus for accomplishing such recording by means of ultra-violet light. Sound recording on film by means of white light as shown, for example, in Fritts Patent 1,203,190 is well known and has heretofore been customarily used in recording sound on film for use in talking motion pictures. When first introduced this system was quite satisfactory, as the film resolution was quite adequate in view of the limited frequency response of the recording galvanometer and the limitations of the optical systems which prevented the recording of high frequencies. The extremely small galvanometer mirror then used and the low speed of the sound recording film made it necessary to allow the recording light beam to be as much as a mil in width in order to obtain sufficient exposure. The small galvanometer mirror made it difficult to form a good image and also added considerable stray light because the ratio of stray reflections from the broken mirror edge to the reflection from the rear surface was relatively large. These limitations of the optical system and galvanometer were gradually reduced. The finite resolving power of the film became a serious barrier to further progress. In order to reduce the effect of the recording slit upon the wave form of the sound record it was found desirable to decrease the narrow dimension of the light beam striking the film to as little as ⅛ of a mil.

The emulsion on the film has a thickness of the order of ½ mil and has a creamy appearance due to the suspended particles of silver halides. These white particles tend to diffuse the light striking the film and therefore cause fogging within the emulsion amounting to more than the width of the light beam. Further, since the emulsion is transparent to white light multiple reflections occur within the film causing it still further fogging.

It has been proposed in Oswald et al. Patent No. 1,928,392 to use ultra-violet light for recording sound. In that patent it is stated that in the use of ultra-violet light it is necessary to use such a light source as Nernst glower, quartz lenses, etc. That patent discloses the avoidance of chromatic errors of the optical system and of diffraction at the slit by the use of monochromatic light. It does not, however, avoid the effect of light-diffusion in the photographic emulsion, which is more damaging in its results than the diffraction and chromatic errors usually occurring in a recording optical system.

I have discovered that by operating an incandescent lamp of the metallic-filament type at the proper temperature I can secure sufficient ultraviolet light for satisfactory sound recording. In addition to this I have discovered that ultraviolet light within certain limits of wave length can be passed through lenses including ordinary flint and crown glasses thereby permitting focusing the apparatus by visible light.

While I have found that ultra-violet light is particularly useful in the performance of my invention the invention is not limited thereto. In some instances the characteristics of the optical system which it is necessary to use are such that the ultra-violet transmission is entirely too low to be satisfactory. In such cases I may use any other narrow band of the spectrum which is appropriate and use in conjunction therewith a film suitably dyed to absorb that portion of the spectrum. It is well recognized in the art that usually dyes which color the emulsion and serve to sensitize the film perform that sensitizing function in the particular portion of the spectrum which is absorbed by the dye. Accordingly by choosing a properly dyed film and using a filter which transmits a corresponding narrow band of the spectrum I am able to secure a substantial portion of the benefits of my invention. However, when it is practical to do so I prefer to use light in the portion of the spectrum which is generally referred to as the "near" ultra-violet.

One object of my invention is to provide an improved optical system for recording sound on film by ultra-violet light.

Another object of my invention is to provide a recording optical system which may be focused by visible light and then operated by ultra-violet light.

Another object of my invention is to provide a recording optical system which can record by ultra-violet light and at the same time be monitored by a visible light.

Another object of my invention is to provide a recording optical system which may be focused by visible light, then operated by ultra-violet light and simultaneously monitored by visible non-actinic light.

Another object of my invention is to provide a method of sound recording which avoids fogging of the emulsion by diffusion of the light.

Another object of my invention is to provide a method of sound recording in which all the incident light is absorbed by the emulsion.

Another object of my invention is to provide a method of sound recording in which no light is reflected from the film base.

Another object of my invention is to provide a method of sound recording which produces extremely sharp definition of the sound record images.

Other and ancillary objects of my invention will be apparent to those skilled in the art from a reading of the following specification and an inspection of the accompanying drawings in which Figure 1 is a plan view of my recording optical system, Fig. 2 is an elevation showing the paths of the recording light through film when white light is used, Fig. 3 is an elevation corresponding to Fig. 2 but showing the effect when my ultra-violet light recording system is used.

In Fig. 4 the variation of gamma with development time for white light and ultra-violet light are shown respectively at A and B.

In Fig. 5 there are shown respectively, A, the color sensitivity of Dupont 201 film exposed with an incandescent lamp burning at a temperature of 3300° K., curve B the transmission of the emulsion on the said film and curve C the transmission of the filter which I prefer to use.

Figure 5:
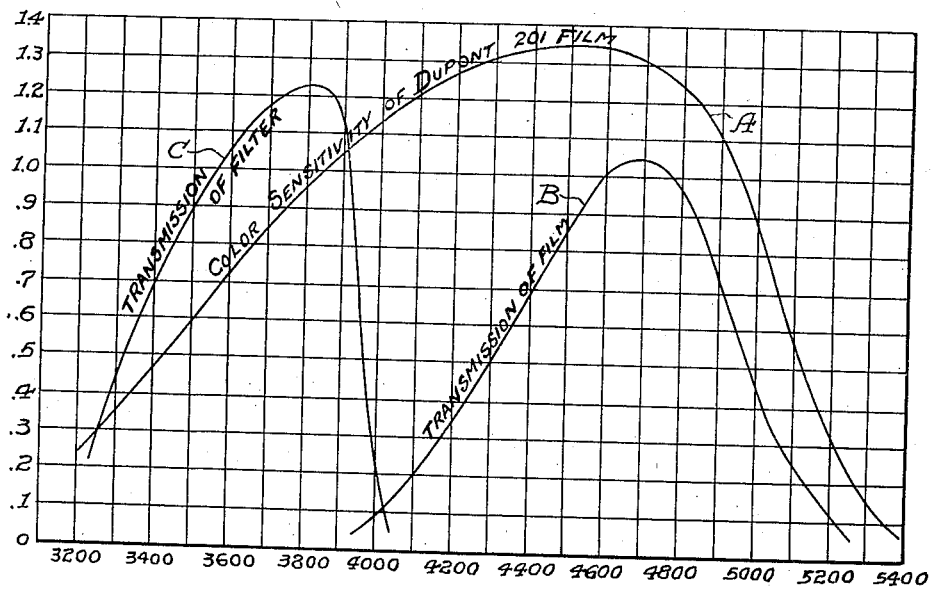
Figure 6:
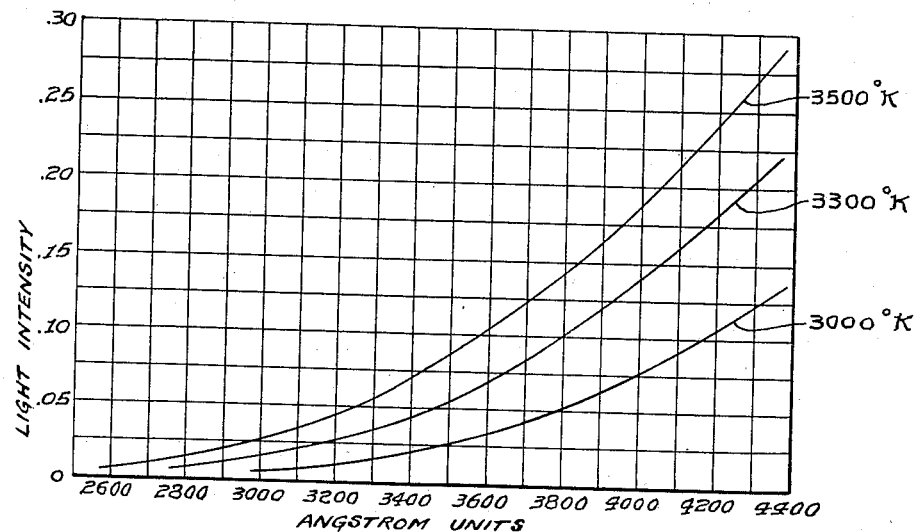
Fig. 6 shows the relative efficiency of an incandescent lamp over the wave lengths used at 3000, 3300 and 3500° K., respectively.
Figure 7:
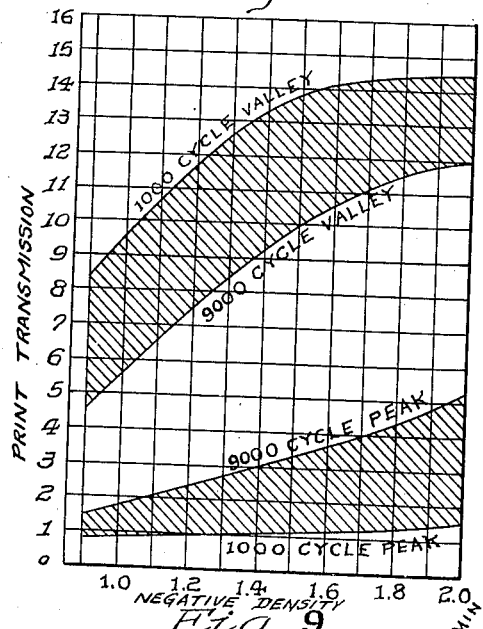
Fig. 7 shows the print transmission plotted against negative density of the sound record at a 1000 cycle peak, a 9000 cycle peak, a 9000 cycle valley and a 1000 cycle valley respectively, the print being made with white light and the shaded area representing the attenuation at 9000 cycles as compared with 1000 cycles.
Figure 8:
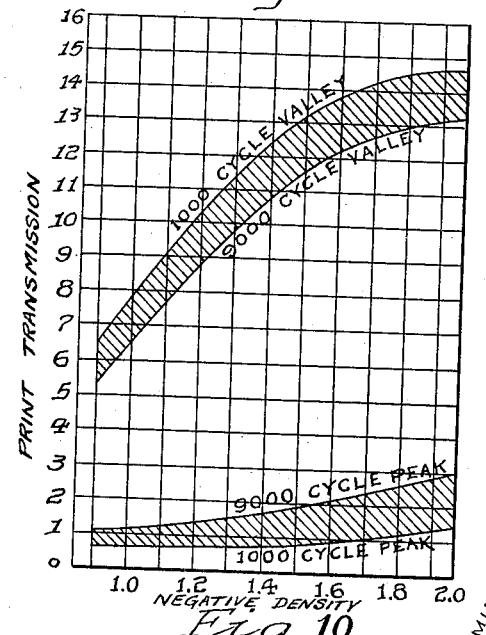

Fig. 8 corresponds to Fig. 7 but shows the corresponding effects when the sound is recorded and printed with a filter transmitting ultra-violet light, the print density being the same as in Fig. 7, i. e. 1.2.

Figure 9:
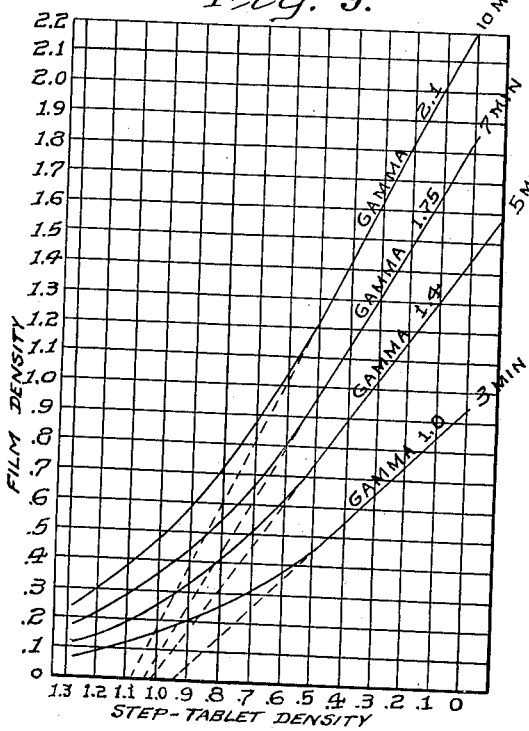

Fig. 9 shows the H and D curves for Dupont 201 film exposed in ultra-violet light as developed in D—16 developer at 68° F. and moving at a speed of 90 feet per minute.

Figure 10:
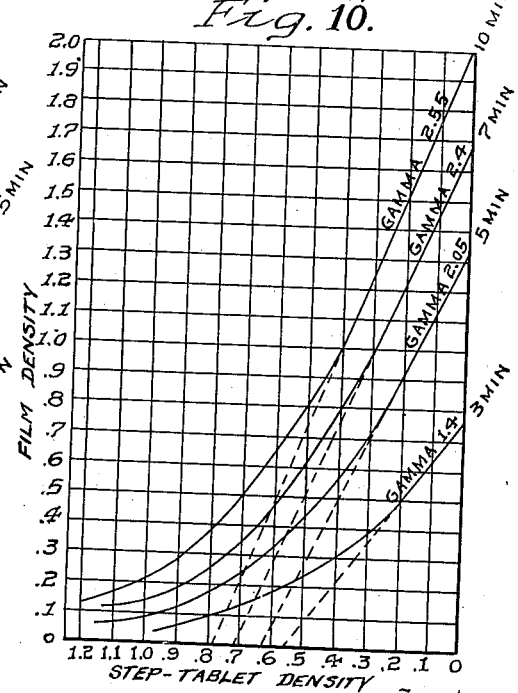

Fig. 10 corresponds to Fig. 9, showing the effects produced when the film is exposed in white light.

Referring now to Fig. 1 a lamp 10 of the metallic coil filament exciter lamp type provides the light for recording. This light passes through a condenser lens 11 which directs it to the recording aperture 12 and also to the monitoring aperture 13. Light from both of these apertures strikes an appropriate modulating means, such as the galvanometer mirror 14, thence the recording light passes through the lens 15, which directs it to the aperture 16, whence it passes to the objective lens 17, which directs it to a fine line of focus on and the film 18. A lens 19 is provided adjacent the galvanometer mirror to properly focus the image of the aperture 12 on the aperture 16. These several apertures may be made in any way customary in the art either using a rectangular aperture at 12 and a slit at 16 with the galvanometer 14 swinging on a vertical axis or using a triangular aperture at 12 and a slit at 16 with the galvanometer 14 swinging on a horizontal axis, the film moving vertically perpendicular to the plane of the paper. A mirror 20 is provided which deflects the light passing through the aperture 13 to the translucent or reflecting monitoring screen 21. The ultra-violet filter may be located either at 22 adjacent the aperture 12 or at 23 between the slit and the film, or both. If the filter is used at 22 and no filter is used at 23 then it is necessary to use a red or equivalent filter at 24 for the monitoring beam. If no filter were used at 24 some stray white light might get into the remainder of the optical system, but by using a red filter no light having any actinic power reaches the rest of the optical system and the red beam is visible to the operator at the monitoring screen. This arrangement is particularly desirable if raw film stock is to be left exposed around the recording room. Under some circumstances it is desirable to use the filter at 23 and omit the filter at 22. In this case the red filter 24 may be omitted and the monitoring done by white light, as the filter at 23 prevents the admission of white light to the film.

The objective lens 17 is preferably so corrected that light in the ultra-violet region which it is desired to use and light in a highly visible portion of the spectrum, for example, in the green, come to the same focus. This enables me to remove the ultra-voilet filters and substitute a green filter and then focus the system by the green light, afterward removing the green filter and replacing the ultra-violet filter.

The effect of the usual recording light beam on ordinary film is shown in Fig. 2. The beam of light indicated at 30 converges at an angle of approximately 30° to the emulsion 31. When it strikes this emulsion it exposes a central area 32 to a considerable degree but at the same time the widening of the beam after passing its focus together with the diffusing effect of the silver halides in the emulsion causes a broadening of the beam to the less brilliant portions 33 and 34, thereby producing a fogging at the edge of the line of light. Considerable of the light, particularly the long wave lengths, is transmitted through the film, the portion of the light falling between the lines 35 and 36 passing through the back of the film and being reflected from any shiny metallic parts of the recorder, thereby tending to produce a general fog on the film. Some of the light at the angle indicated by the lines 35 and 36 is reflected as indicated at 37 and 38 thereby producing a further fog, and any of the light which emerges from the emulsion into the film base at such angles as indicated at 39 and 40 is necessarily subjected to total internal reflection, returning to meet the emulsion at 41 and 42. It will be apparent that this light diffused in the film produces fogging, and the reflected light will produce a general fog of the entire emulsion thereby decreasing the ratio of blackness of the sound record to that of the background and decreasing both the volume and high frequency fidelity of the recording.

In the apparatus according to my invention the light converges in the same type of beam as indicated at 30 but, due to the fact that this light is totally absorbed by the film, it produces only a small wedge-shaped exposed area as indicated at 43 and is practically entirely absorbed in the thickness of the emulsion, the absorption of the film serving to prevent the diffusion indicated at 33 and 34 in Fig. 2. It will be apparent that this type of exposure provides a record which is very sharp at the surface of the film and becomes narrower and thinner toward the rear of the emulsion. It will be apparent that by using a suitably dyed film, preferably dyed very slightly yellow as in the Dupont 201 film stock referred to above, this absorption of the light used can be made to reach practically 100% within the thickness of the emulsion, thereby preventing any such reflection effects as shown in Fig. 3.

As stated before the invention is not limited to this use of ultra-violet light which relies on the normal color of the film. For example, I may use light covering a relatively narrow band in the violet, blue or even the green or other parts of the spectrum provided the film is so dyed as to be absorbent of and sensitive to the particular band used. Any dye commonly used for sensitizing in a specific region may be used provided it is absorbent in that region, and a proper filter or combination of filters can be prepared to give a transmission preferably corresponding to a narrow portion at the peak of the absorption produced by the dye. It will be also apparent that the same method is used in printing as in recording, thereby securing the same sharpness of definition in the positive print as was secured in the original negative.

The beneficial results produced by my improved method and apparatus are illustrated by the curves of Figs. 7 and 8.

In these figures the abscissae represent negative densities and the ordinates are arbitrary units representing print transmission. It will be apparent from an inspection of these figures that the shaded portion in each represents the attenuation at 9,000 cycles as compared with that at 1,000 cycles. At 1,000 cycles or below it may be assumed that there is little or no attenuation due to the resolving power of the emulsion. A comparison of Figs. 7 and 8 makes it apparent that the relative attenuation at 9,000 cycles using ultra-violet recording or other narrow frequency band recording decreases the attenuation at high frequencies to only a small fraction of that resulting when white light or a broad band of light frequencies is used.

It will be apparent to those skilled in the art that my invention may be used in conjunction with any customary type of recording apparatus or with any of the customary accessories thereto. For example, I may use my invention in a recording system such as that shown in McDowell Patent No. 1,855,197 or I may use it in a recording system such as that shown and described in Dimmick Patent No. 1,999,721, and in either of these cases I may omit the use of ground noise reduction without sacrificing any of the relative advantages of my invention. Likewise, I may use recording by ultra-violet light in connection with the use of any other suitable type of light modulating means, such as a light valve, either of the variable width electro-mechanical type or of the Kerr cell type. I prefer to use a system analogous to that of the above Dimmick patent by using a single equilateral triangular beam of light controlled by a ground noise reduction amplifier, as described in the said Dimmick patent, or to use two opposed equilateral triangles with the tips of their images just touching the slit, thereby forming a push-pull system.

Figs. 9 and 10, as mentioned in the brief description thereof above, gives a series of H & D curves for the above mentioned Dupont 201 film exposed with white light and with filtered ultra-violet light. These curves were made by passing an accurately calibrated step tablet in front of the recording slit while the film was going through the recorder. The step tablet density was plotted against the track density for various times of development in D—16 developer at 68 degrees F. It may be seen that for a given development time, the gamma is much higher for white light than for ultra-violet light. The reason for the decreased contrast when using ultra-violet light is that the effective thickness of the exposed layer is less due to absorption in the emulsion.

I claim as my invention:

1. The method of sound recording comprising the step of directing a beam of modulated light within a predetermined band of light frequencies upon a photographic emulsion having high sensitivity and substantially complete absorption in that frequency band.

2. The method of sound recording comprising the step of directing a beam of modulated light within a predetermined band of light frequencies upon a photographic emulsion highly sensitive to and substantially completely absorbent of that frequency.

3. The method of sound recording including directing a beam of light of wave length between 3200 and 4000 Angstrom units upon a film highly sensitive to said light and having substantially complete absorption at wave lengths less than 4000 Angstrom units, and modulating said beam of light in accordance with the sound to be recorded while it is directed upon said film.

GLENN L. DIMMICK.